United States Patent

Richard

[11] Patent Number: 6,090,175
[45] Date of Patent: Jul. 18, 2000

[54] AIR INLET FOR A DUST COLLECTOR

[76] Inventor: Kenneth L. Richard, P.O. Box 538, Uwchland, Pa. 19480

[21] Appl. No.: 09/241,870

[22] Filed: Feb. 2, 1999

[51] Int. Cl.⁷ ..................................................... B01D 45/12
[52] U.S. Cl. ................................. 55/337; 55/413; 55/418; 55/458; 55/459.1; 55/462; 55/463
[58] Field of Search .............................. 55/337, 413, 418, 55/458, 459.1, 459.3, 462, 463, 331, 349, 459.2, 459.5

[56] References Cited

U.S. PATENT DOCUMENTS

| 971,215 | 9/1910 | Rakestraw . | |
|---|---|---|---|
| 1,746,253 | 2/1930 | Hawley | 55/463 |
| 2,963,109 | 12/1960 | Brookman et al. . | |
| 2,977,205 | 3/1961 | Austin | 55/463 |
| 3,953,184 | 4/1976 | Stockford et al. | 55/458 |
| 4,014,671 | 3/1977 | Andro et al. | 55/463 |
| 4,198,290 | 4/1980 | Summers . | |
| 4,865,633 | 9/1989 | Stevenson | 55/459.1 |
| 5,042,998 | 8/1991 | Beusen | 55/459.1 |
| 5,123,939 | 6/1992 | Morin et al. . | |
| 5,129,930 | 7/1992 | Gauthier . | |
| 5,484,575 | 1/1996 | Steenackers | 55/463 |

Primary Examiner—David A. Simmons
Assistant Examiner—Minh-Chau T. Pham
Attorney, Agent, or Firm—Brady, O'Boyle & Gates

[57] ABSTRACT

An air inlet for a dust collector wherein a scroll inlet duct and an associated cylindrical duct are mounted on the top wall of the dust collector housing so that dust-laden gas flows into the scroll duct and through the cylindrical duct resulting in a rotational path of downwardly flowing gas within the cylindrical duct providing a centrifugal force on the gas so that when the dust-laden gas enters the collector housing it spreads outwardly toward the walls of the collector housing and downwardly resulting in a substantial cloud of uniform flow of dust-laden gas over the length and width of the collector housing to provide a uniform deposit of dust particles on the filters while precluding abrasion of the filter media. A perforated metal plate is positioned in the collector housing in proximity to the outlet of the cylindrical dust to facilitate the outward and downward flow of dirty gas in the collector housing.

6 Claims, 3 Drawing Sheets

_(cover page — column 1)_

AIR INLET FOR A DUST COLLECTOR

BACKGROUND OF THE INVENTION

Typically, dirty gas is conveyed at a high velocity through an air inlet into a housing of a dust collector containing filters wherein dust particles from the dirty gas are deposited on the filters. The particle-laden gas is conveyed into the dust collector at such a high velocity that the dust particles abrade the filter media requiring the replacement thereof. Another problem with the high velocity inlet employed heretofore in dust collectors is the reentrainment or rehandling of dust particles within the dust collector, resulting in uneven deposits of dust particles on the filters which leads to areas of blinding. Those filter areas hardest hit in the beginning continue receiving the same blast of dirty gas, and more and more dust is retained in these areas until the filter areas which received less flow and dust originally soon receive all the flow at much higher velocities, all resulting in shorter filter life, higher pressure drop across the collector, and lowered performance.

To overcome the problem of filter abrasion and dust particle reentrainment, after considerable research and experimentation, the air inlet of the present invention has been devised to convey dirty gas to a dust collector in such a manner that it enters the dust collector housing as a cloud of dust which envelops the filters in the housing to thereby provide uniform dust deposits along with a uniform air flow through all the filters.

SUMMARY OF THE INVENTION

The air inlet of the present invention comprises, essentially, a scroll inlet duct mounted on the top wall of a dust collector housing. A vertically-positioned cylindrical duct is mounted in the center of the scroll duct. The upper end of the cylindrical duct is spaced from the top wall of the scroll duct, and the lower end of the cylindrical duct communicates with the interior of the collector housing. A deflector is mounted in the scroll inlet duct, and a spreader deflector and associated perforated metal plate deflector are mounted in the outlet of the cylindrical duct. By this construction and arrangement, dust-laden gas flows into the scroll duct and is directed over the top edge of the cylindrical duct, resulting in a rotational path of downwardly flowing gas within the cylindrical duct providing a centrifugal force on the gas so that when the gas enters the collector housing, it spreads outwardly toward the walls of the collector housing and downwardly resulting in a substantially uniform downward flow of gas over the width and length of the collector housing, whereby the filters are provided with uniform dust deposits, along with a uniform air flow through all the filters.

DESCRIPTION OF THE PREFERRED EMBODIMENT

Figure 2:
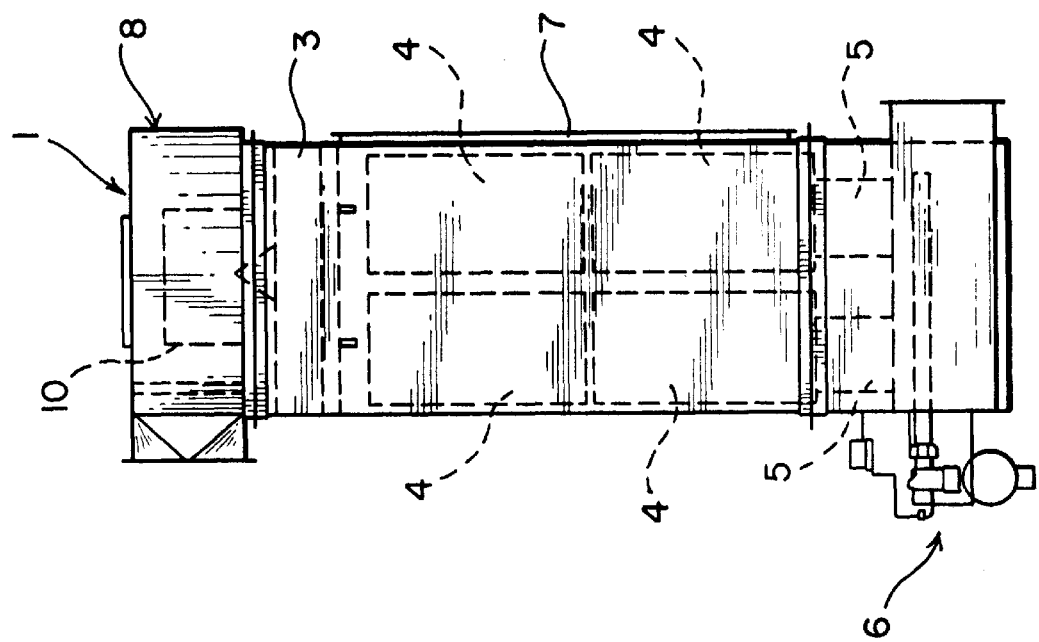
FIG. 2 is a side elevational view of the air inlet shown in FIG. 1.
Figure 1:
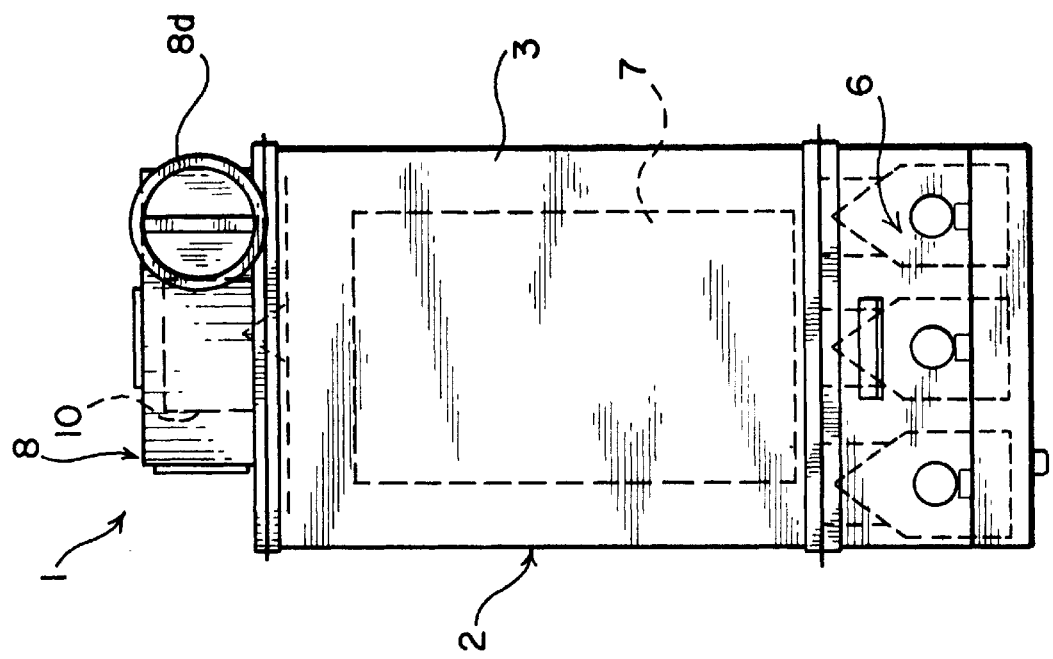
FIG. 1 is a front elevational view of the air inlet of the present invention mounted on the top of a dust collector housing.

Referring to the drawings, and, more particularly, to FIGS. 1 and 2, the air inlet 1 of the present invention is adapted to be mounted on the top wall of an industrial downflow dust collector 2 which includes a housing 3 enclosing filter elements and a plurality of clean air ducts 5 which are positioned below the filter elements 4 and communicate with the lower open ends thereof.

From the structure thus far described, it will be apparent that particulate-laden gases flow through the inlet 1 into the dust collector 2 and then downwardly, surrounding the filter elements 4 and flowing radially inwardly through each filter, leaving some dust particles entrained on the outer surface of each filter 4 while some other particles will continue on to the lower portion of the housing 3. The cleaned gases exit from the filter elements 4 into the clean air ducts 5, through which they are conducted from the housing 3 to the atmosphere.

In order to periodically remove the accumulated dust particles on the outer surface of the filters 4, a reverse flow cleaning of the filter elements 4 is provided by an assembly 6 for supplying high pressure pulses of compressed air to the filter elements.

To complete the structure of the dust collector housing, a filter element access door 7 is provided in the rear wall of the housing 3.

Figure 3:
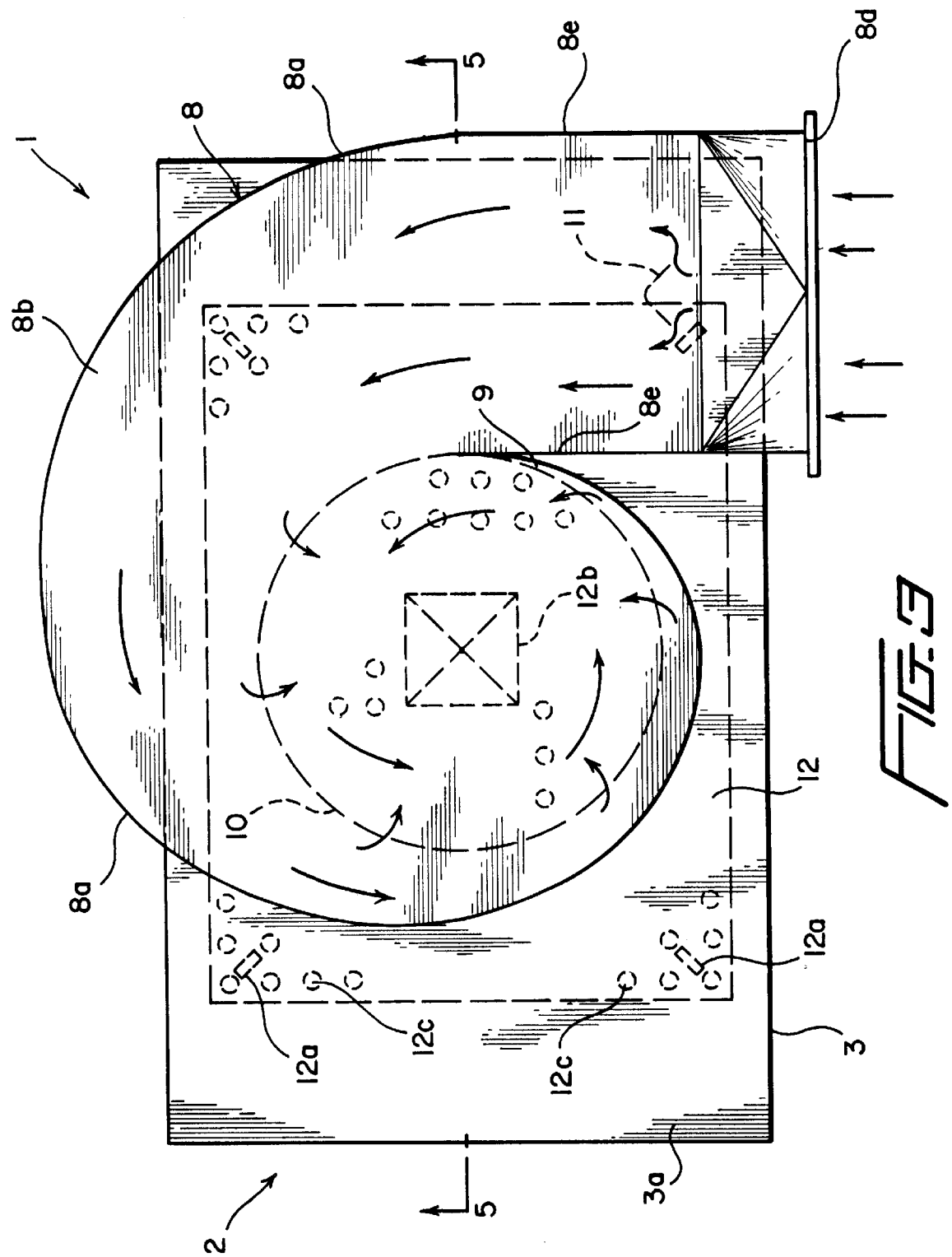
FIG. 3 is an enlarged top plan view of the air inlet.
Figure 4:
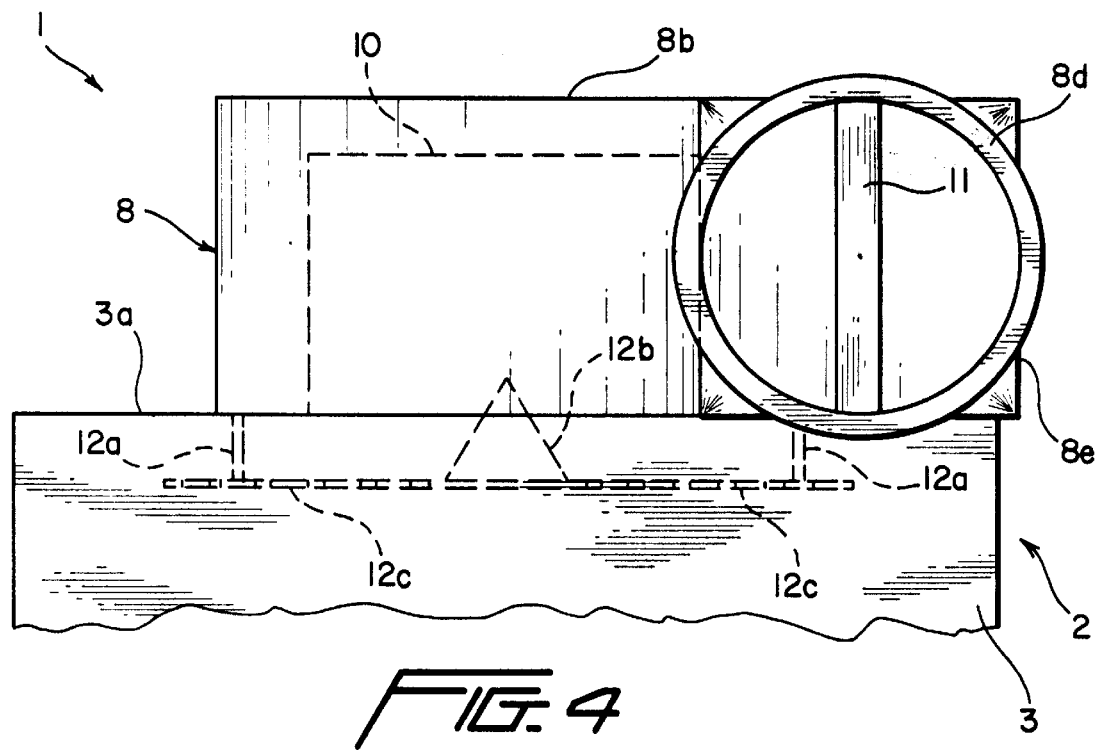
FIG. 4 is an enlarged, fragmentary, front elevational view of the air inlet.
Figure 5:
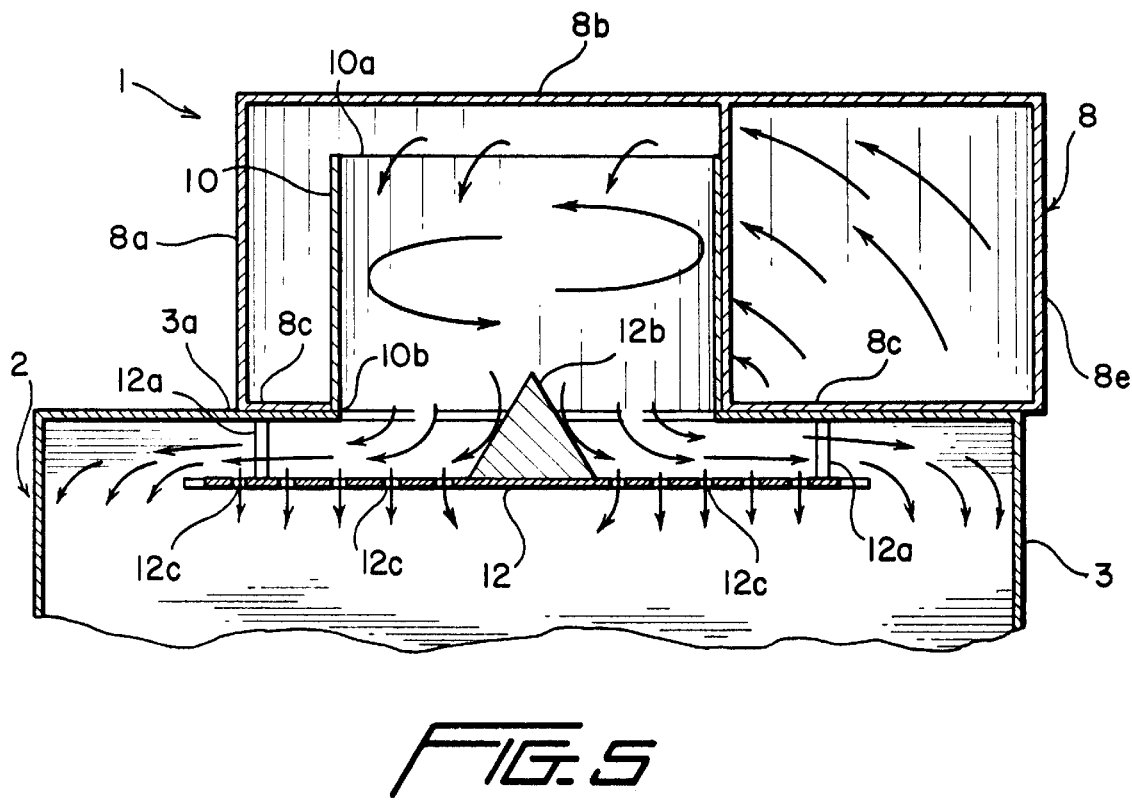
FIG. 5 is a view taken along line 5—5 of FIG. 3.

To overcome the problem of uneven deposits of dust particles on the filters, caused by conventional dust collector inlets, the air inlet 1 of the present invention has been devised, the details of which are illustrated in FIGS. 3 to 5. The air inlet 1 comprises a scroll duct 8 having an arcuate outer side wall 8a which progressively turns inwardly to merge as at 9 with the sidewall of an open-ended cylindrical duct 10, as shown in FIG. 3, integral with the center of the scroll duct 8 which also has a top wall 8b and a bottom wall 8c. The top edge 10a of the cylindrical duct 10 is positioned below the top wall 8b of the scroll duct to thereby provide a space or passageway for the air to flow into the cylindrical duct 10. The bottom edge 10b of the cylindrical duct communicates with the interior of the dust collector housing 3.

To complete the structures of the air inlet 1, as will be seen in FIG. 4, the inlet 8d to the scroll duct 8 communicates with the scroll duct entrance 8e, and a spoiler 11 is mounted within, and extends across, the scroll duct entrance 8e to force an adjustment of the air flow.

A perforated metal plate 12 is positioned below and in spaced relationship to the bottom edge 10b of the cylindrical duct 10 and top wall 3a of the collector housing 3, the metal plate 12 being suspended from the top wall 3a of the housing 3 by hangers 12a. A deflector 12b is centrally mounted on the plate 12, and a plurality of apertures 12c are provided in the plate 12.

In the operation of the air inlet 1, a horizontal linear flow of dirty gas entering the inlet 8a of the scroll duct 8 is changed to a circular flow around the exterior of the cylindrical duct 10. Since the area of the scroll duct passage between the side wall 8a of the scroll duct and the outer side wall of the cylindrical duct 10 progressively decreases to the position 9, the circular flow is replaced by radial flow, and all the ditty gas is forced over the top edge 10a of the cylindrical duct 10, and by the time dirty gas reaches the position 9, all of the flow out of the scroll duct 8 is completed. The space between the top edge 10a of the cylindrical duct 10 and the top wall 8b of the scroll duct 8 determines the velocity of the gas flow entering the cylindrical duct, whereby a downwardly spiraling flow of gas is provided in the cylindrical duct 10 into the duct collector housing 3. The radial motion of gases when exiting the cylindrical duct 10 have a centrifugal force component directing the flow of gas towards the walls of the duct collector housing 3. The perforated metal plate 12 and associated deflector 12b assist in moving the gas, not only radially outwardly, but vertically downwardly through the apertures 12c.

By the construction and arrangement of the air inlet 1, the dirty gas enters the dust collector 2 as a cloud type of formation at the top of the collector housing 3 so that the downward flow of gas is uniform by the time it reaches the area of the filters 4, thereby providing a laminar flow of dirty gas over all the filters 4.

From the above description, it will be apparent to those skilled in the art that the air inlet of the present invention is an improvement over conventional air inlets for dust collectors in that the air inlet of the present invention prevents the abrasion of the filter media, and evenly deposits the dust particles on the filters.

While the air inlet 1 of the present invention has been described for use for conveying dirty gas to an industrial dust collector 2, it could also be employed in other air handling or ventilation systems, wherein conditioned air is conveyed to a room as a cloud type of formation, rather than a blast of high velocity air, so that the downward flow of conditioned air is uniform by the time it reaches the occupants of the room, thereby enhancing the comfort of the room occupants who would otherwise be subjected to a blast of high velocity air.

It is to be understood that the form of the invention herewith shown and described is to be taken as a preferred example of the same, and that various changes in the shape, size, and arrangement of parts may be resorted to, without departing from, the spirit of the invention or scope of the subjoined claims.

I claim:

1. An inlet for conveying a fluid to a housing having a top wall, said fluid inlet comprising a horizontally disposed scroll duct mounted on the top wall of the housing, said scroll duct having an inlet, an open-ended vertically disposed cylindrical duct mounted on the top wall of the housing and communicating with the interior of the housing, said cylindrical duct having a top edge and a bottom edge, said scroll duct having a top wall and a bottom wall and an arcuate side wall extending progressively radially inwardly to merge with a side wall of said cylindrical duct to thereby provide a progressively decreasing scroll duct passage between the side wall of the scroll duct and the cylindrical duct, the top edge of the cylindrical duct being spaced below the top wall of scroll duct, whereby a horizontal linear flow of gas entering the scroll duct inlet is transformed to a circular flow around the exterior of the cylindrical duct, the progressively decreasing scroll duct passage changing the circular fluid flow to radial flow forcing the fluid over the top edge of the cylindrical duct to a downwardly spiraling flow through the cylindrical duct into the housing to thereby provide a cloud formation of fluid at the top of the housing which flows uniformly downwardly in the housing.

2. An inlet according to claim 1, wherein the scroll duct inlet has a circular cross-section and the scroll duct passage has a rectangular cross-section.

3. An inlet according to claim 2, wherein a spoiler is mounted within, and extends across, the scroll duct passage in proximity to the scroll duct inlet.

4. An inlet according to claim 1, wherein means for deflecting the flow of fluid from the cylindrical duct is mounted in the housing below the lower edge of the cylindrical duct.

5. An inlet according to claim 4, wherein the means for deflecting the flow of fluid from the cylindrical duct comprises a plate suspended from the top wall of the housing in proximity to the lower edge of the cylindrical duct, a deflector centrally mounted on the plate, and a plurality of apertures provided in said plate, whereby the plate and associated deflector deflects the spiral flow of fluid not only radially outwardly of the housing, but also vertically downwardly through the apertures.

6. An inlet according to claim 1, wherein the housing comprises a dust collector containing a plurality of filters and the fluid is dirty gas containing dust particles, whereby a cloud of dust particles flows uniformly downwardly to envelope the filters to thereby evenly deposit dust particles on the filters while precluding abrasion of the filter media.

\* \* \* \* \*